(12) United States Patent
Wu et al.

(10) Patent No.: US 8,847,886 B2
(45) Date of Patent: Sep. 30, 2014

(54) NON-CONTACT INPUT APPARATUS FOR COMPUTER PERIPHERAL AND METHOD OF THE SAME

(75) Inventors: Ho-Sung Wu, New Taipei (TW); Chih-Min Liu, New Taipei (TW)

(73) Assignee: Kye Systems Corp., New Taipei (TW)

( * ) Notice: Subject to any disclaimer, the term of this patent is extended or adjusted under 35 U.S.C. 154(b) by 279 days.

(21) Appl. No.: 13/425,738

(22) Filed: Mar. 21, 2012

(65) Prior Publication Data

US 2012/0242575 A1 Sep. 27, 2012

(30) Foreign Application Priority Data

Mar. 23, 2011 (TW) .............................. 100109963 A (51) Int. Cl.
 *G06F 3/033* (2013.01)
 *G06F 3/0354* (2013.01)
 *G06F 3/046* (2006.01)

(52) U.S. Cl.
 CPC ............ *G06F 3/046* (2013.01); *G06F 3/03545* (2013.01)
 USPC ........... 345/157; 345/158; 345/173; 345/179; 320/137; 178/18.01; 178/18.03; 178/18.07; 178/19.03; 178/19.07

(58) Field of Classification Search
 CPC ....... G06F 1/3203; G06F 1/266; G06F 3/046; G06F 3/03545; G06F 3/038
 USPC ........ 345/158, 173, 179; 320/137; 178/18.01, 178/18.03, 19.01, 18.07, 19.03, 19.07
 See application file for complete search history.

(56) References Cited

U.S. PATENT DOCUMENTS

| | | | | |
|---|---|---|---|---|
| 5,619,431 A * | 4/1997 | Oda | ............................... | 702/150 |
| 5,793,360 A * | 8/1998 | Fleck et al. | ................... | 345/179 |
| 5,898,136 A * | 4/1999 | Katsurahira | ............... | 178/18.01 |
| 7,319,368 B2 * | 1/2008 | Berhorst et al. | .......... | 331/117 R |
| 7,436,164 B2 * | 10/2008 | Vos | ............................... | 323/293 |
| 7,956,851 B2 * | 6/2011 | Vos | ............................... | 345/174 |
| 8,040,329 B2 * | 10/2011 | Vos | ............................... | 345/179 |
| 8,040,330 B2 * | 10/2011 | Hauck | ........................... | 345/179 |
| 8,089,474 B2 * | 1/2012 | Geaghan et al. | ............. | 345/174 |
| 8,134,542 B2 * | 3/2012 | Hagen et al. | .................. | 345/179 |
| 8,159,474 B2 * | 4/2012 | Hauck | ........................... | 345/179 |
| 8,243,049 B2 * | 8/2012 | Vos | ............................... | 345/179 |
| 2005/0237123 A1 * | 10/2005 | Berhorst et al. | .......... | 331/117 R |
| 2008/0149401 A1 * | 6/2008 | Hagen et al. | ................ | 178/18.08 |
| 2008/0149402 A1 * | 6/2008 | Vos | ............................. | 178/19.01 |
| 2008/0150550 A1 * | 6/2008 | Vos | ............................. | 324/655 |
| 2008/0150658 A1 * | 6/2008 | Vos | ............................... | 334/15 |
| 2008/0150916 A1 * | 6/2008 | Vos | ............................... | 345/179 |
| 2008/0150917 A1 * | 6/2008 | Libbey et al. | ................. | 345/179 |
| 2008/0150918 A1 * | 6/2008 | Hagen et al. | ................. | 345/179 |
| 2008/0156546 A1 * | 7/2008 | Hauck | ......................... | 178/19.01 |
| 2008/0158165 A1 * | 7/2008 | Geaghan et al. | ............. | 345/173 |
| 2010/0276214 A1 * | 11/2010 | Liu et al. | .................... | 178/18.03 |
| 2012/0000717 A1 * | 1/2012 | Hauck | ......................... | 178/19.01 |
| 2012/0119990 A1 * | 5/2012 | Liu | ............................... | 345/158 |
| 2012/0271971 A1 * | 10/2012 | Wu | ............................... | 710/15 |
| 2013/0285900 A1 * | 10/2013 | Liu | ............................... | 345/156 |

* cited by examiner

*Primary Examiner* — Lun-Yi Lao
*Assistant Examiner* — Peter D McLoone
(74) *Attorney, Agent, or Firm* — Bacon & Thomas, PLLC (57) ABSTRACT

A non-contact input apparatus for computer peripheral includes an induction module and a pointing module. The induction module includes an electric supply coil and an induction element, and the pointing module includes an energy coil and a non-linear element. The electric supply coil is used to send a first oscillation signal. The energy coil receives the first oscillation signal. The non-linear element converts the first oscillation signal to be a second oscillation signal having multiple higher harmonics. The induction element generates a control signal based on the second oscillation signal.

7 Claims, 7 Drawing Sheets

NON-CONTACT INPUT APPARATUS FOR COMPUTER PERIPHERAL AND METHOD OF THE SAME

CROSS-REFERENCE TO RELATED APPLICATIONS

This non-provisional application claims priority under 35 U.S.C. §119(a) on Patent Application No(s). 100109963 filed in Taiwan, R.O.C. on Mar. 23, 2011, the entire contents of which are hereby incorporated by reference.

BACKGROUND

1. Technical Field

The disclosure relates to an input apparatus, and more particularly to a non-contact input apparatus for computer peripheral and method of the same.

2. Related Art

Currently, a digital board is used with a wireless pointer. When a wireless pointer contacts a digital board, the wireless pointer will generate an electromagnetic induction signal. In such a way, the digital board may utilize magnetic coupling to calculate the coordinates of the wireless pointer and then send the coordinates to the computer.

In order to avoid the inconvenience of using batteries, the power source supply needed by the wireless pointer can be obtained by electromagnetic resonance. After receiving the electromagnetic resonance signal, the wireless pointer converts the electromagnetic resonance signal to be the electromagnetic induction signal.

Figure 1:
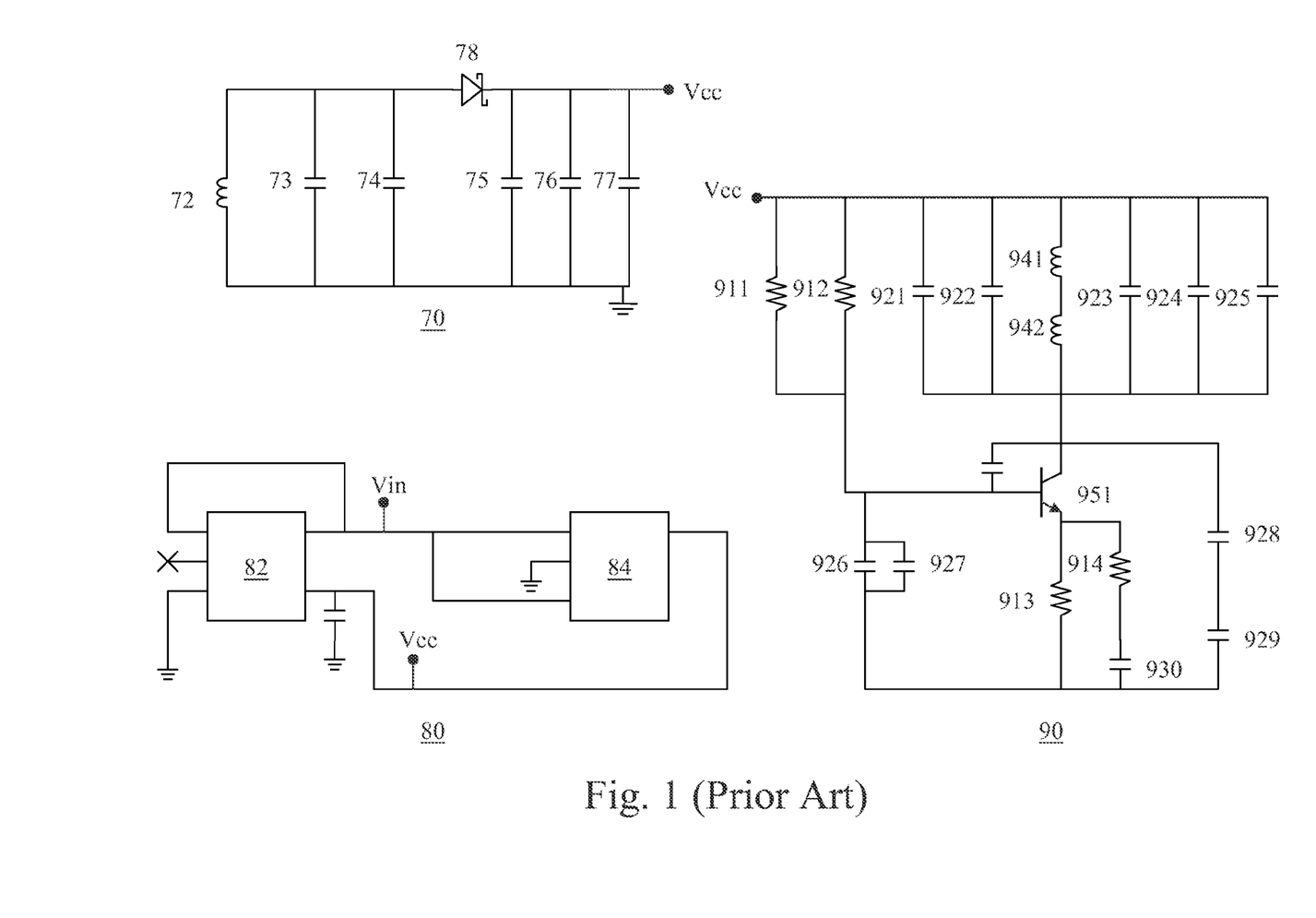
FIG. 1 is a prior art circuitry of a wireless pointer.

In the prior art, the wireless pointer comprises two different coils, one of which is used to receive the electromagnetic resonance signal, and the other of which is used to transmit the electromagnetic induction signal. FIG. 1 shows a prior art circuitry of a wireless pointer. The wireless pointer comprises a receiving module 70, a conversion module 80, and a transmitting module 90. Furthermore, the receiving module 70 comprises a first coil 72, a first capacitor 73, a second capacitor 74, a third capacitor 75, a fourth capacitor 76, a fifth capacitor 77, and a Zener diode 78. The conversion 80 comprises a filter 82 and a DC to DC converter 84. The transmitting module 90 comprises a first resistance 911, a second resistance 912, a third resistance 913, a fourth resistance 914, a sixth capacitor 921, a seventh capacitor 922, a eighth capacitor 923, a ninth capacitor 924, a tenth capacitor 925, a eleventh capacitor 926, a twelfth capacitor 927, a thirteenth capacitor 928, a fourteenth capacitor 929, a fifteenth capacitor 930, a second coil 941, a third coil 942, and a first diode 951.

The first coil 72 is used to receive the electromagnetic resonance signal. The second coil 941 and the third coil 942 are used to transmit the electromagnetic induction signal. Accordingly, the prior art wireless pointer has too many elements. The more elements there are, the higher the manufacture cost of the wireless pointer will be. Although the above mentioned capacitors can be replaced by a capacitor with a greater capacitance, the capacitor with a greater capacitance usually requires a greater amount of room which results in a big wireless pointer.

SUMMARY

In one aspect, a non-contact input apparatus for computer peripheral comprises an induction module and a pointing module. The induction module comprises an electric supply coil for generating a first oscillation signal and an induction element for generating a control signal based on a second oscillation signal. The pointing module comprises an energy storage coil for receiving the first oscillation signal and generating an induction voltage in response to the first oscillation signal and a non-linear element connected the energy storage coil for clamping the induction voltage to generate the second oscillation signal.

In another aspect, a non-contact input method for computer peripheral comprises generating a first oscillation signal by an induction module; generating an induction voltage by a pointing module in response to the first oscillation signal; clamping the induction voltage by a non-linear element of the pointing module to generate a second oscillation signal; generating a control signal by the induction module based on the second oscillation signal.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

The following embodiments will further describe features and advantages of the present disclosure. Persons skilled in the art can implement the disclosure under the teaching of the following descriptions, and they can easily understand the purposes and advantages of the disclosure based on the following embodiments, appended claims, and drawings.

Figure 2:
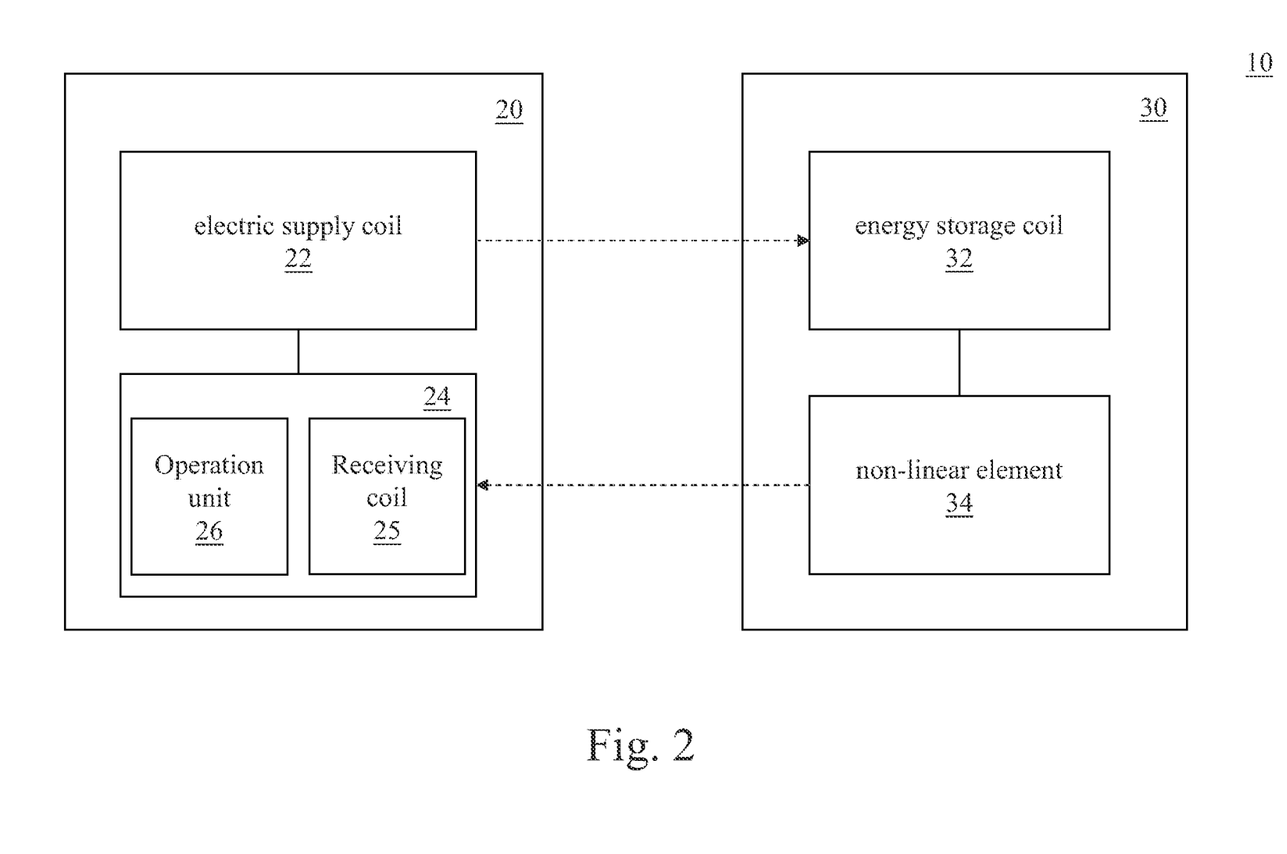
FIG. 2 is a block diagram of a non-contact input apparatus for computer peripheral according to an embodiment of the disclosure.

FIG. 2 is a block diagram of a non-contact input apparatus for computer peripheral according to an embodiment of the disclosure.

The non-contact input apparatus 10 comprises an induction module 20 and a pointing module 30. The induction module 20 may be a digital board, and the pointing module 30 may be a digital pen. The induction module 20 corresponds to the pointing module 30, and the pointing module 30 can be disposed in the work area of the induction module 20. The non-contact input apparatus 10 can be used as a computer peripheral. When a user controls the pointing module 30, the non-contact input apparatus 10 operates the computer.

The induction module 20 comprises an electric supply coil 22 and an induction element 24. The electric supply coil 22 generates a first oscillation signal. The induction element 24 generates a control signal according to a second oscillation signal. The first and second oscillation signals may be electromagnetic waves with different frequencies.

More particularly, the electric supply coil 22 may be a ring conductor. After receiving an alternating current (AC), the electric supply coil 22 converts the AC to electromagnetic wave. The induction element 24 comprises a receiving coil 25 and an operation unit 26. The receiving coil 25 generates an induction current in response to the resonance of the second oscillation signal. According to the current value of the induction current, the operation unit 26 determines the signal strength of the second oscillation signal, and then generates the control signal based on the signal strength.

The pointing module 30 comprises an energy storage coil 32 and a non-linear element 34. The energy storage coil 32 is used to receive the first oscillation signal. The non-linear element 34 connected to the energy storage coil 32 is used to clamp the induction voltage to generate the second oscillation signal.

The energy storage coil 32 can generate an induction current in response to the resonance of the first oscillation signal, and generate an induction voltage corresponding to the induction current.

Figure 3:
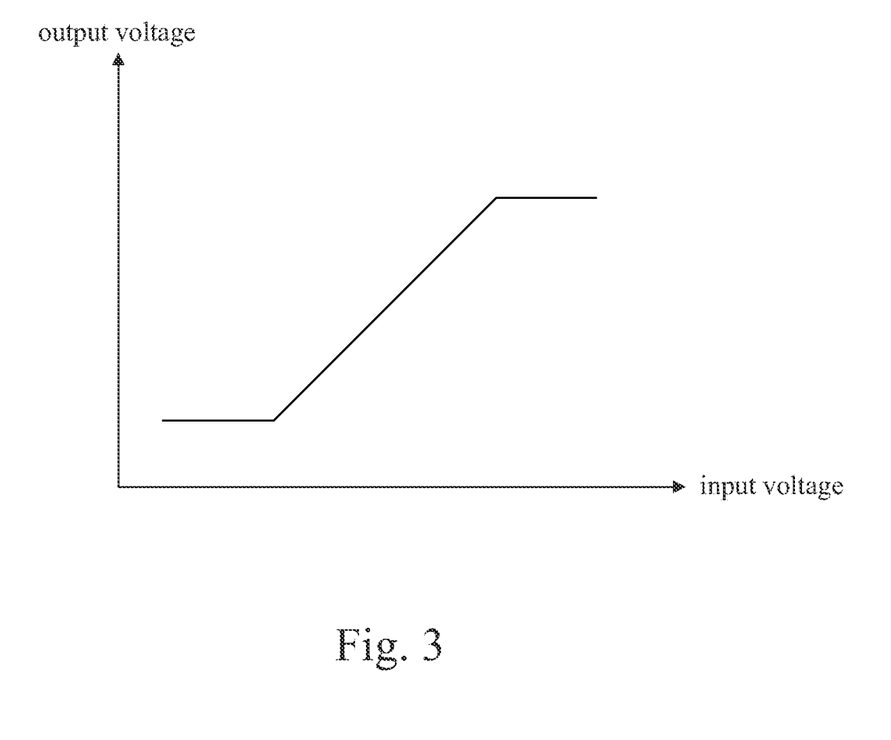
FIG. 3 a conversion graph of a non-linear element according to an embodiment of the disclosure.

FIG. 3 shows a conversion graph of the non-linear element 34. In FIG. 3, the horizontal axis shows voltage values of an input signal, and the vertical axis shows voltage values of an output signal. When a voltage value of the input signal falls in a first range, the voltage value of the output signal is in proportion to the voltage value of the input signal. When a voltage value of the input signal falls in a second range, the voltage value of the output signal maintains a fixed value. More specifically, values in the first range are between the high critical value and the low critical value. When the voltage value of the input signal is higher than the high critical value, the voltage value of the output signal is clamped to be a first fixed value, and when the voltage value of the input signal is lower than the low critical value, the voltage value of the output signal is clamped to be a second fixed value.

Figure 4A:
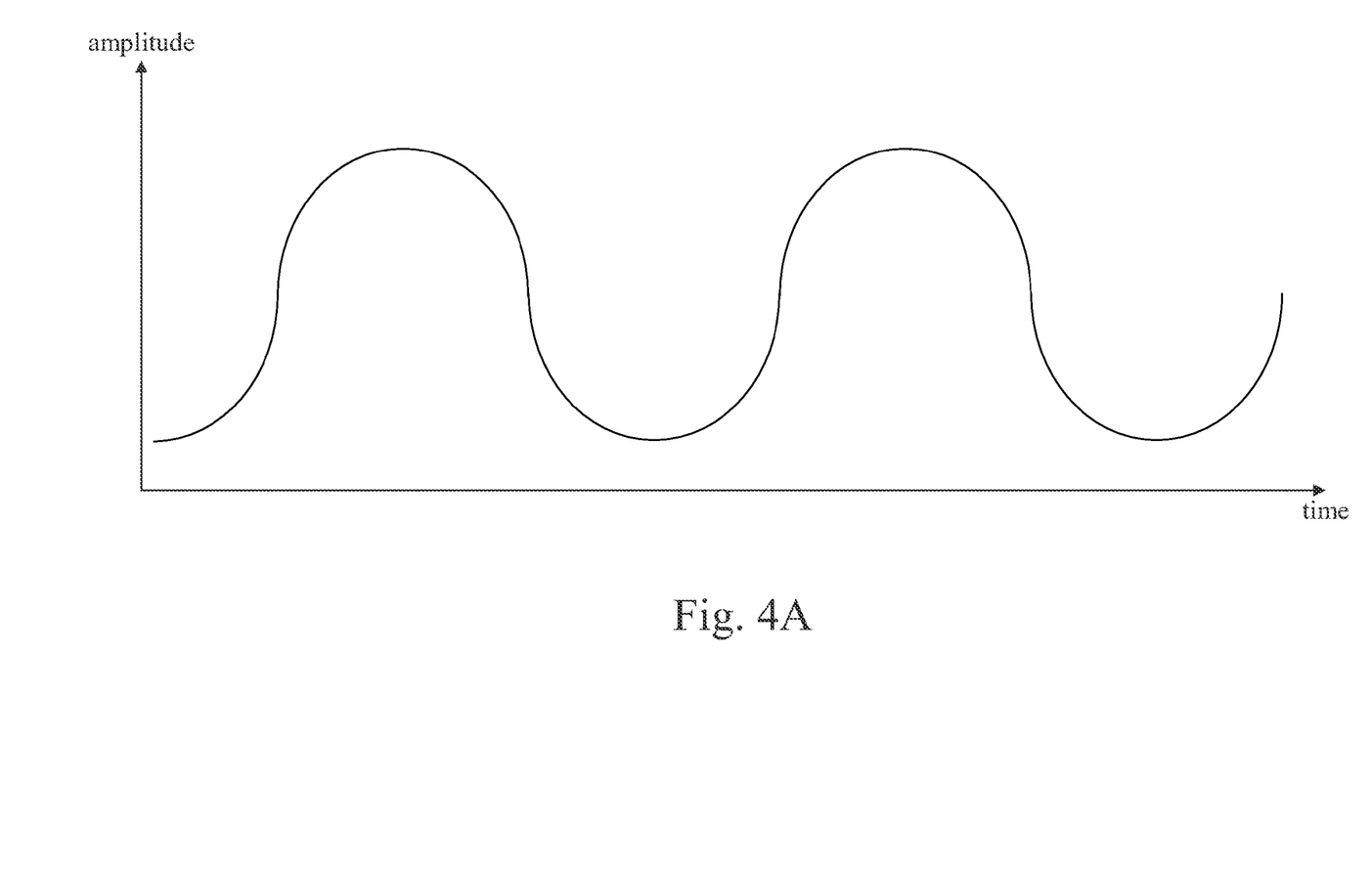
FIG. 4A shows a timing diagram for voltages of an input signal.
Figure 4B:
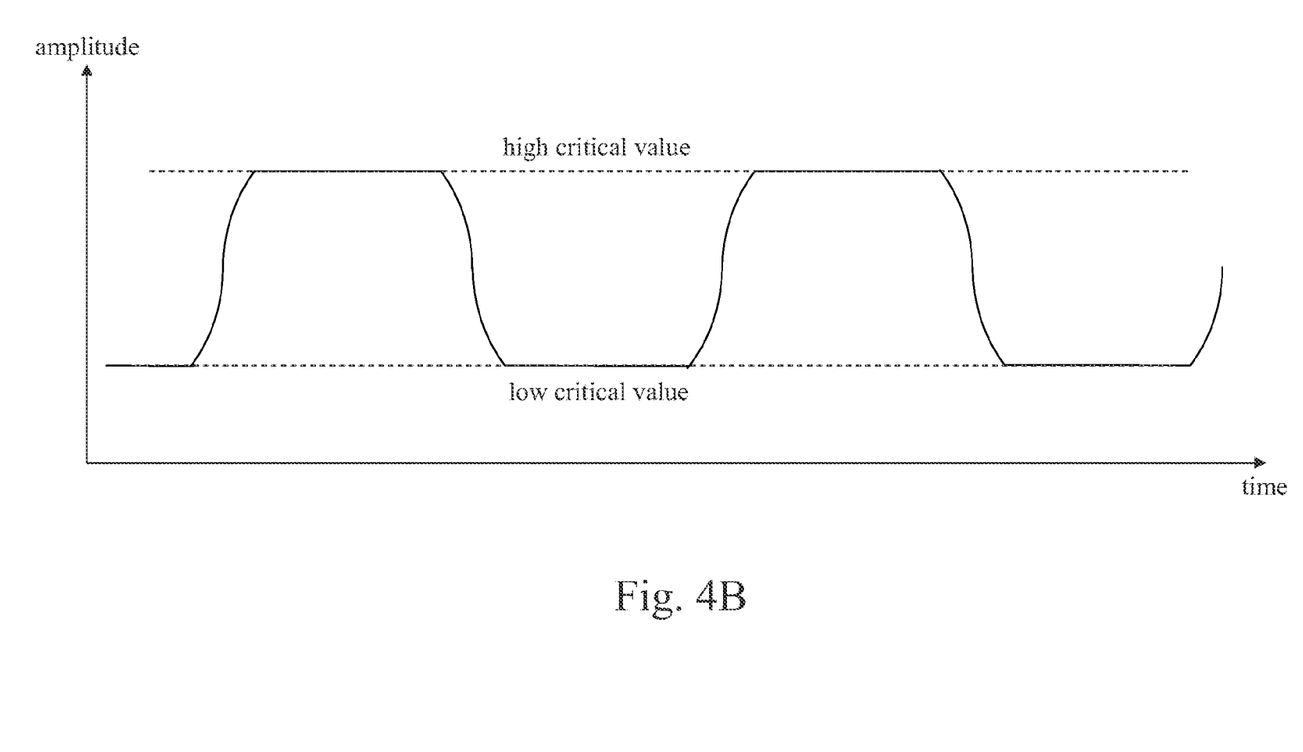
FIG. 4B shows a timing diagram for voltages of an output signal.

FIG. 4A shows a timing diagram for voltages of an input signal, and FIG. 4B shows a timing diagram for voltages of an output signal. In this embodiment, when a voltage value of the input signal is in the first range, the voltage value of the output signal equals to the voltage value of the input signal. The waveform of voltages of the input signal is a sin wave as a function of time. In the positive half-period, when the amplitude of the sin wave is greater than its high critical value, the voltage value of the output signal is clamped to be its high critical value. In the negative half-period, when the amplitude of the sin wave is smaller than its low critical value, the voltage value of the output signal is clamped to be its low critical value.

Because the induction voltage is generated by the resonance of the first oscillation signal, both the induction voltage and the first oscillation signal have a same first frequency. The non-linear element 34 clamps the induction voltage, so that the induction voltage has a discontinuous waveform. Some higherharmonics may appear on the frequency spectrum of the discontinuous wave. The frequency of a higherharmonic may be a few times of the first frequency.

The second oscillation signal sent from the pointing module 30 has the first frequency and a few higherharmonics of the first frequency. The induction module 20 filters the second oscillation signal to obtain a positioning signal. The amplitude of a higherharmonic decreases as the distance between the higherharmonic and the first frequency on the frequency spectrum is getting larger. Therefore, the induction module 20 selects the higherharmonic with its frequency closest to the first frequency to be the positioning signal. To achieve this purpose, the induction module 20 may comprise a bandpass filter which filters the second oscillation signal to obtain the positioning signal. In the embodiment, the center frequency of the bandpass filter is the triple frequency of the first frequency. That is, a center frequency of the positioning signal is the triple frequency of the first frequency. After obtaining the positioning signal, the induction module 20 generates the control signal based on the positioning signal.

Figure 5:
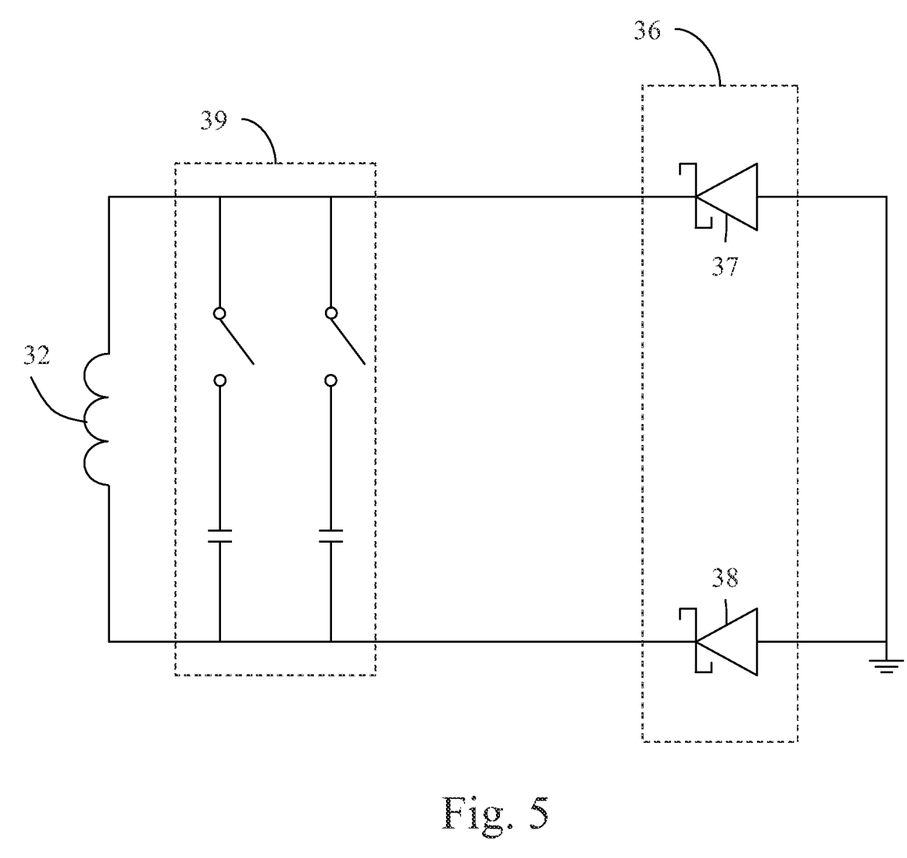
FIG. 5 shows an embodiment of a circuitry for the pointing module.

FIG. 5 shows an embodiment of a circuitry for the pointing module 30. As shown in FIG. 5, the pointing module 30 comprises a chopper circuit 36, an energy storage coil 32, and a matching capacitor 39. In the embodiment, the storage energy coil 32 is an inductor. The chopper circuit 36 is the non-linear element 34 as discussed above. Furthermore, the chopper circuit 36 comprises a first Zener diode 37 and a second Zener diode 38. The first Zener diode 37 is used to clamp the positive half-period of the first oscillation signal, and the second Zener diode 38 is used to clamp the negative half-period of the first oscillation signal. The equivalent capacitance value of the matching capacitor 39 can be adjusted by switching the two switches included in the matching capacitor 39, so that the resonant frequency of the first oscillation signal can be adjusted and it can be ensured that the energy storage coil 32 receives the first oscillation signal.

Figure 6:
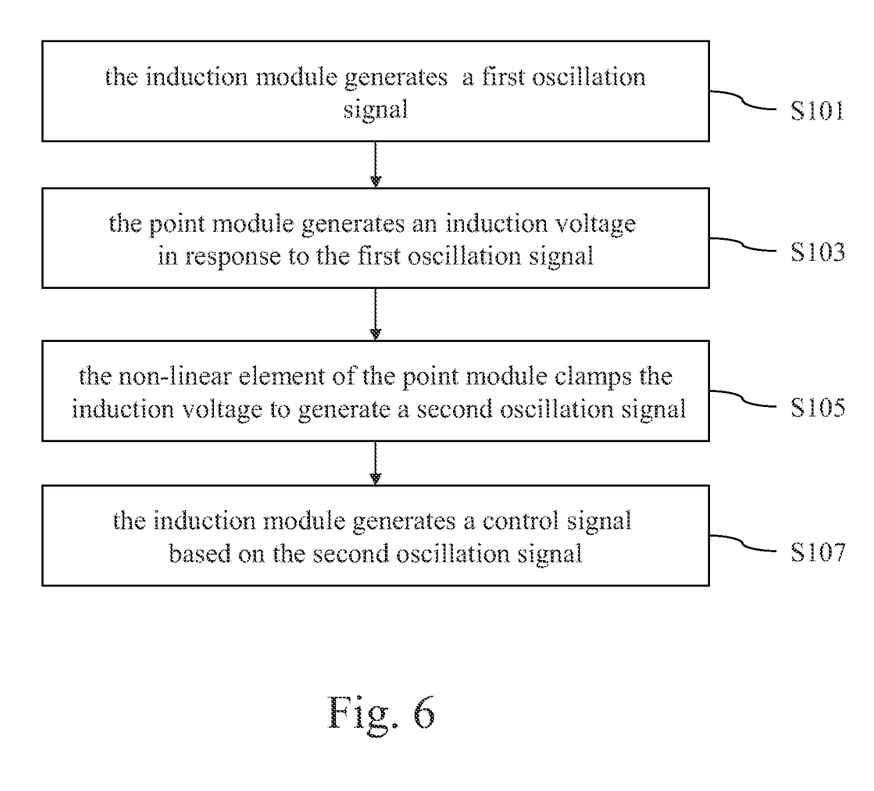
FIG. 6 is a flowchart of a non-contact input method for computer peripheral according to an embodiment of the disclosure.

The following will describe a non-contact input method for computer peripheral. FIG. 6 is a flowchart of the non-contact input method. The method comprises the following steps.

In the step S101, the induction module 20 generates a first oscillation signal to the pointing module 30.

In the step S103, the pointing module 30 receives the first oscillation signal, and generates the induction voltage in response to the first oscillation signal.

In the step S105, the non-linear element 34 of the pointing module 30 clamps the induction voltage to generate a second oscillation signal, and the pointing module 30 sends the second oscillation signal to the induction module 20.

In the step S107, the induction module 20 generates a control signal based on the second oscillation signal.

According to the non-contact input apparatus of the present disclosure, the pointing module includes only a few elements to generate the second oscillation signal. The pointing module sends the second oscillation signal to the induction module, and then the induction module generates the control signal based on the second oscillation signal. Compared with the prior art, many elements of the pointing module can be saved and thus the manufacture cost is greatly decreased.

Although embodiments are disclosed as above, they are not intended to limit the scope of disclosure. It should be understood that various alternations and modifications without departing from the spirit and scope of the disclosure are included in the scope as defined by the appended claims.

What is claimed is:

1. A non-contact input apparatus for computer peripheral, comprising:
   an induction module, comprising:
   an electric supply coil for generating a first oscillation signal; and
   an induction element for generating a control signal based on a second oscillation signal; and
   a pointing module, comprising:
   an energy storage coil for receiving the first oscillation signal and generating an induction voltage in response to the first oscillation signal; and
   a non-linear element connected to the energy storage coil for clamping the induction voltage with a predetermined voltage swing to generate the second oscillation signal;
   wherein the first oscillation signal has a first frequency, the second oscillation signal has the first frequency and multiple higher harmonics of the first frequency, and the induction element is configured to filter the second oscillation signal to obtain a positioning signal and generate the control signal based on the positioning signal.

2. The non-contact input apparatus for computer peripheral according to claim 1, wherein a center frequency of the positioning signal is a triple frequency of the first frequency.

3. The non-contact input apparatus for computer peripheral according to claim 1, wherein the non-linear element is a chopper circuit.

4. The non-contact input apparatus for computer peripheral according to claim 3, wherein the chopper circuit comprises a first Zener diode and a second Zener diode, and the first Zener diode is configured to clamp a positive half-period of the first oscillation signal and the second Zener diode is configured to clamp a negative half-period of the second oscillation signal.

5. The non-contact input apparatus for computer peripheral according to claim 4, wherein the pointing module comprises a matching capacitor.

6. A non-contact input method for computer peripheral, comprising:

generating a first oscillation signal by an induction module;

generating an induction voltage by a pointing module in response to the first oscillation signal;

clamping the induction voltage with a predetermined voltage swing by a non-linear element of the pointing module to generate a second oscillation signal, wherein the first oscillation signal has a first frequency, the second oscillation signal has the first frequency and multiple higher harmonics of the first frequency, and the second oscillation signal is filtered to obtain a positioning signal; and generating a control signal by the induction module based on the second oscillation signal.

7. The non-contact input method for computer peripheral according to claim 6, wherein the non-linear element is a chopper circuit.

* * * * *